Figure 1:
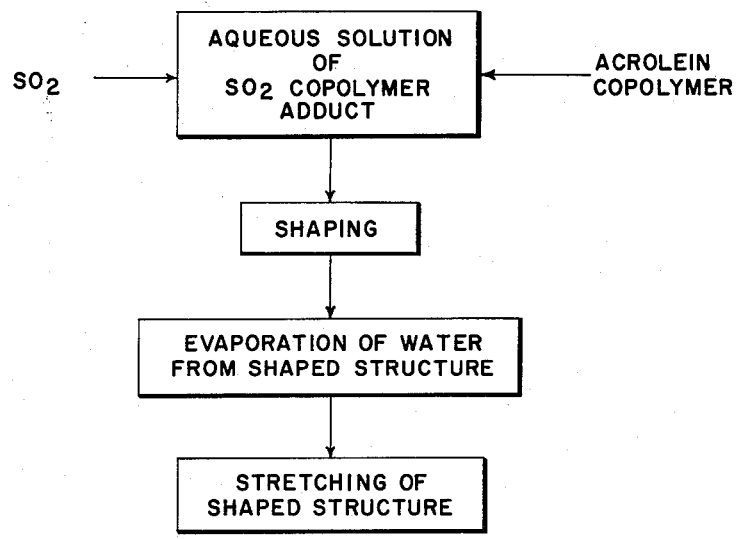

April 9, 1963 P. SCHLACK ET AL 3,084,992
PROCESS FOR THE MANUFACTURE OF SHAPED STRUCTURES
FROM ACROLEIN POLYMERS
Filed July 14, 1960

INVENTORS
Paul Schlack
BY Wolfgang Göltner
Curtis, Morris & Safford
ATTORNEYS

United States Patent Office 3,084,992
Patented Apr. 9, 1963

3,084,992
PROCESS FOR THE MANUFACTURE OF SHAPED
STRUCTURES FROM ACROLEIN POLYMERS
Paul Schlack, Leitershofen, near Augsburg, and Wolfgang
Göltner, Kriftel, Taunus, Germany, assignors to Farbwerke Hoechst Aktiengesellschaft vormals Meister
Lucius & Bruning, Frankfurt am Main, Germany, a
corporation of Germany
Filed July 14, 1960, Ser. No. 42,757
Claims priority, application Germany July 18, 1959
10 Claims. (Cl. 18—54)

The present invention relates to a process for the manufacture of shaped structures, such as filaments, foils, films or ribbons, of improved properties from copolymers of acrolein and derivatives of acrylic acid.

It is known that polymers of acrolein or copolymers predominantly built up from acrolein can be dissolved in an aqueous solution of alkali bisulfite or sulfurous acid with the formation of adducts containing sulfo groups.

When such aqueous solutions, for example of 8% strength, are allowed to evaporate on a plane base, they form, with a sufficient degree of polymerization, clear films which, however, generally have but a low tensile strength and are brittle. This applies particularly to homopolymers of acrolein which have been obtained in the presence of a radical polymerization initiator. The behavior of films which have been produced in the same manner from solutions of copolymers built up predominantly from acrolein in aqueous sulfurous acid is not much better. Although the latter may have satisfactory initial properties, they lose their shock resistance after a short time of storage, especially at elevated temperatures. This embrittlement is due to an inevitable partial cross-linking occurring via oxygen bridges. Although such films are water-insoluble owing to the cross-linking, they swell strongly in water since they still contain relatively firmly bound sulfo groups. Also for this reason, they are not even suitable for applications which require only a low wet fastness.

Now we have found that valuable shaped structures such as filaments or films can be obtained in spite of the inevitable cross-linking via oxygen bridges which already sets in on drying, by making the shaped structures from aqueous solutions of adducts of sulfur dioxide with copolymers of acrolein and at least 30% of derivatives of acrylic acid. After evaporation of the solvent, the shaped structures are improved by heat-stretching. It would be expected that the shaped structures, being cross-linked via C—O—C bonds, could no longer be stretched. However, the cross-linking bridges are obviously split temporarily under the action of heat and tension. Otherwise, the possibility of heat-stretching and the obtainment of an orientation with simultaneous setting of the stretched articles could not be explained.

Figure 2:
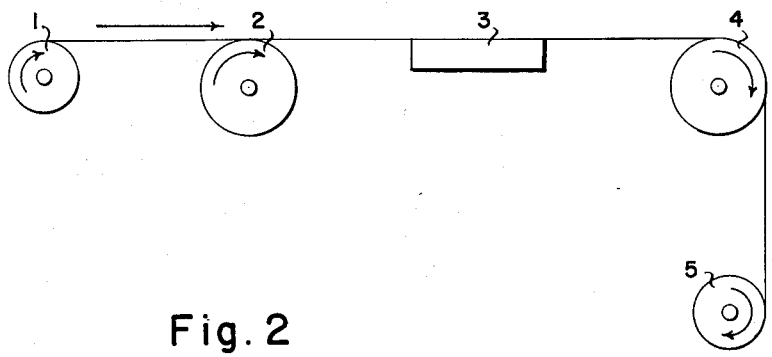

In the accompanying drawings illustrating features of the present invention,

FIG. 1 is a flow diagram showing the formation of shaped structures from an aqueous solution of an adduct of sulfur dioxide and an acrolein copolymer, the evaporation of water from the shaped structure, and the stretching of the shaped structure; and FIG. 2 is a schematic drawing showing conventional means for stretching shaped structures such as films or filaments. FIG. 2 shows such a shaped structure passing from bobbin or roll 1 over draw-off roll 2 and heated plate 3 to roll 4 rotating at higher speed than roll 2 (whereby the shaped structure is stretched), and then to bobbin or roll 5 for winding the stretched material.

The following are examples of derivatives of acrylic acid which may be used for the shaped structures such as films, filaments or ribbons to be made by the process of the invention: alkyl esters of acrylic acid, advantageously acrylic acid methyl ester, acrylic acid alkylamides, for example acrylic acid ethylamide, acrylic acid dimethylamide, and especially acrylonitrile.

The copolymers of acrolein may be obtained in known manner by a radical-initiated polymerization. There are preferably used products which have been obtained by emulsion polymerization in the presence of a redox system, for example alkali persulfate/alkali bisulfite, and small additions of activating metal ions, for example silver nitrate and ferro sulfate, as initiators. As dispersing agents there are used the substances commonly used for this purpose, for example alkyl sulfonates, fatty alcohol sulfates, salts of higher sulfocarboxylic acids or non-ionic surface-active substances based on ethylene oxide. Besides or instead of surface-active dispersing agents, there are advantageously added hydrophilic protective colloids, particularly those containing no alcoholic hydroxyl groups in the polymer chain, for example polyacrylic acid, polyvinyl pyrrolidone, copolymers of vinyl pyrrolidone and acrylic acid, advantageously high molecular weight polyethylene oxides and furthermore water-soluble copolymers of ethylene oxide and propylene oxide. The copolymers so obtained can be readily worked up into shaped structures of good tensile strength. This applies particularly to copolymers of acrolein with low alkyl esters of acrylic acid as main component. The best results are, however, obtained with acrolein copolymers which have not been obtained by the usual polymerization in an aqueous solution or dispersion but with the help of a redox system such as alkali persulfate/alkali metabisulfite in the presence of a mixture of water and a water-soluble solvent, especially in the presence of low glycols such as ethylene glycol, 1,3-propylene glycol and preferably 1,2-propylene glycol. The solvent mixture consists of 1 part by weight of water and 1.5 to 4.5 parts by weight of organic solvent.

This process is especially important for the manufacture of the starting materials since it enables copolymers which have a high content of acrylonitrile and are soluble in aqueous sulfur dioxide to be obtained in a good yield. Even when the copolymers are built up to a very high extent from acrylonitrile, they may still be completely soluble in aqueous sulfurous acid or aqueous alkali bisulfite solution. As starting materials there are advantageously used copolymers with more than 50%, for example 60 to 70%, of acrylonitrile. The copolymers obtained by this solution-dispersion process have the further advantage that, owing to their relatively low specific viscosity, more or less concentrated solutions, for example of 12 to 24% strength, can be obtained which in spite of the low viscosity of the copolymer yield shaped structures of particularly improved tensile strength, for example films which already before stretching have a tensile strength of 800 to 1100 kg./cm.$^2$. The possibility of preparing relatively concentrated solutions is of great importance for the quality of the shaped structures and is also important from an economical view point.

Whereas films may be cast from solutions of relatively low viscosity, for example 300 to 800 centipoises, it is of advantage to make filaments from solutions of higher viscosities, for example 4000 to 12000 centipoises, although solutions of lower viscosity, for example 1000 centipoises at a concentration of 15% of solid substance, still yield filaments of rather good tensile strength. In general, however, solutions of higher viscosity can be spun more easily.

The copolymers are advantageously worked up into filaments according to the dry spinning process by extruding the spinning solution through a nozzle into a shaft in which the solvent is evaporated.

Similar to the former spinning of cellulose nitrate rayon, the dry spinning of the copolymers may be carried out in an upward direction. This method is advantageous in view of the necessity of keeping the nozzle cool and enables filaments of high tensile strength to be obtained. It is, however, more economical to carry out the spinning step in a downward direction whereby the nozzles should be at a minimum distance from one another to avoid coalescing. For medium concentrations of 15 to 18%, the said minimum distance amounts to about 15 to 12 mm. As is the case with all dry spinning processes, care has to be taken that the drying air is conducted through the shaft without formation of eddies; advantageously, a cool stream of drying gas is blown in near the nozzle at an acute angle to the filament.

When the spinning is carried out in an upward direrection, a high tensile strength is obtained primarily, that is to say before stretching the filaments, at a high break of elongation, for example a tensile strength of 4 to 6 grams at an elongation of 150 to 60%, while a spinning process which is carried out in a downward direction leads to a lower tensile strength, for example 2 to 3.5 grams/denier at an elongation at break of 160 to 120%. By the stretching process, the tensile strengths of the filaments obtained by the two processes are somewhat assimilated to one another; however, even then the tensile strength of the filaments obtained by downward spinning is inferior to that obtained by upward spinning.

Prior to casting or spinning, the polymer solutions may be partially freed from excess amounts sulfur dioxide, as far as the concentration permits to do so. To remove the sulfur dioxide in excess, the solution which, if desired, may be heated to about 30° C., may be conducted, for example, over large surfaces, advantageously under reduced pressure. It has been taken into account, however, that part of the sulfo groups of the polymer solution is present in labile bonds. For this reason, solutions of relatively high concentration and polymers having a relatively low content of aldehydic component may require a proportion of sulfur dioxide which is larger than the proportion necessary for saturating the aldehyde groups or hemiacetal groups and depends on the concentration of the polymer. In the case of highly concentrated solutions, it is, therefore, of advantage to saturate the solution with sulfur dioxide, if desired under an excess pressure of sulfur dioxide, and then to remove the excess of sulfur dioxide only to such an extent that no coagulation occurs. Depending on the concentration which generally ranges from 12 to 20%, the solutions advantageously contain 3 to 8% of sulfur dioxide in excess which can be determined iodometrically, the excess amount of sulfur dioxide being the larger, the higher the concentration of the solution. It is, quite generally, of advantage that the drying of the shaped structures prior to stretching be carried out cautiously and only as long as is necessary at temperature below 200° C., if desired under reduced pressure. It is impossible to give numerical data of general applicability since, if the time of drying is short and the material to be dried is moved, the temperature of the shaped structures may differ strongly from the temperature of the drying chamber or the heated conveying means, for example a roll. Since the drying process is associated with chemical changes, the drying temperature has to be thoroughly controlled and maintained constant, especially when the process is carried out continuously.

Films take a longer time to dry than filaments and the chemical reaction occurring on drying (cross-linking phenomena) are more pronounced so that filaments are, in general, easier to stretch than films.

For the manufacture of filaments by dry spinning, apparatus of known type are used. When the spinning is carried out in a downward direction whereby the nozzle is disposed in a shaft, care has to be taken that the spinning solution which is sensitive to heat is kept at a low temperature, for example 20 to 30° C., and that the filaments, during the first phase of drying, for example through a distance of 2 meters from the spinning nozzle at an entire length of the spinning shaft of 5 to 7 meters, are passed through hot air whose temperature gradually rises from about 25° to at most 90° C. Only at a further distance may the temperature in the shaft rise above 90° C., for example to 150 to 180° C.; otherwise there is a danger that the freshly spun filaments are weakened by the formation of bubbles or blisters. The spinning velocities are within the range usually applied for dry spinning and may vary, for example, between 50 and 500 m./minute. As spinning nozzles there may be used those of metal, glass or ceramic material. Spinning nozzles whose boreholes are 0.1 to 0.35 mm. in diameter are advantageously used. The bore length may amount, for example, to up to 20 mm. with a bore diameter of 0.3 mm. The use of such nozzles is advantageous in view of the specific rheological properties of sulfurous acid solutions.

For the heat-stretching of films or filaments according to the invention, the usual methods and apparatus are used. For example, films may be stretched with the help of rolls running at different speed whereby at least one of the feeding rolls may be heated or a heating chamber may be disposed between the units of rolls. Alternatively, the films may be stretched by inflating tubular structures with hot gases and subsequently cutting them open. It is also possible to subject the films to a deep drawing at elevated temperatures. For the heat-stretching of filaments, the apparatus commonly used in the man-made fiber industry are used, for example two or more pairs of rolls of increasing draw speed which are connected in series between the rolls heating devices may be disposed and between the feed rolls and the draw rolls running at increased speed snubbing devices may be installed before the heating zone, for example stretching pins which may be heated.

The temperature to be used for stretching the shaped structures such as filaments or films, for example, to 200 to 600% of their initial length depends on various factors so that the optimum temperature has to be determined in a given case by simple test series. As already mentioned above, the temperature used for drying and the period of time for which the heat acts upon the material on drying influence the stretchability at elevated temperatures. The working speed and the thickness of the shaped structures have also to be taken into account when choosing the stretching temperature. In general, the optimum temperature for filaments is lower than that for films and two-dimensional structures. Ribbons and films are generally stretched at a temperature within the range of 60 to 160° C., advantageously 115 to 130° C. For example, films obtained from a copolymer of acrolein and acrylonitrile (35:65) as described in column 2, lines 28 et. seq. and which have been dried in a drying chamber at 100 to 120° C. are stretched at a temperature ranging from 150 to 160° C. If, however, these films have been dried at room temperature or a temperature somewhat above room temperature, they may be stretched already at a temperature between 70 and 100° C. Similar differences are obtained by inserting a heating step between drying at low temperature and stretching at elevated temperature. Filaments which generally possess a certain pre-orientation and also a lower degree of cross-linking are stretched at a temperature of 50 to 120° C. When the stretching is carried out while conducting the shaped structures rapidly through the heating medium, temperatures above 120° C., for example between 150 and 200° C. may be used, depending on the contact time and the properties of the material.

The stretchability is also a function of the composition of the copolymer. The heat-stretchability increases with the content of acrylonitrile owing to the fact that, in this case, the number of aldehydic cross-linking bridges decreases. The same applies to the obtainable change in length. For example, films which have been obtained from a copolymer of acrolein and acrylonitrile (35:65) in the manner described in column 2, lines 28 et. seq., can be stretched by 250 to 550% depending on the conditions of drying, whereas copolymers containing only 30% of acrylonitrile can be stretched by only about 100 to 200%.

Contrary to what would be expected, it has been found that by the heat-stretching process, which is here associated with a chemical change, the macromolecules of the material can be compressed to such an extent that the stretched films, foils, filaments and ribbons, without being subjected to a special chemical hardening process, substantially maintained their dimensions on being treated with boiling water, provided the non-recurring shrinkage on boiling, which may amount to 15 to 18% for foils and 28 to 32% for filaments, is taken into account. In view of the cross-linking occurring on drying and the presence of sulfo groups which are bound in a stable manner, a much higher degree of shrinkage would have been expected from experience with mechanically after-treated, i.e. stretched, shaped structures made from other slightly cross-linked thermo-plastic materials. The improvement of the resistance to boiling water by heat-stretching is particularly important for filaments and fibers which have been obtained from concentrated aqueous solutions without substantial drawing during the spinning process.

The shaped structures may also be produced and thereafter stretched in a continuous manner. In this case, it is, however, essential that stretching is carried out only after the solvent has substantially evaporated.

The degree of stretching and the quality of the finished shape structures may be improved by the addition of a high molecular weight plasticizer of hydroscopic nature. There may advantageously be used polyglycol ethers, particularly polyethylene oxides of an average molecular weight of about 20,000 or more, although lower polymer products, for example of an average molecular weight of 5,000 to 10,000, may also be used. They may be added in a considerable proportion, for example 10 to 15% or even 20%. There are preferably used polyethers containing terminal hydroxyl groups which obviously enter into reaction with hemiacetal hydroxyl groups in the polymer during the formation of films or fibers. However, there may also be used polyglycol ethers whose terminal hydroxyl groups are closed by esterification, for example acetylation or reaction with isocyanates, for example phenyl isocyanate or cyclohexyl isocyanate. The polyethers which are free from terminal hydroxyl groups are however, more easily washed out of the finished products than polyethers containing terminal hydroxyl groups so that the latter kind of polyethers is more suited for filaments and films which, in use, are exposed to water. Instead of unitary water-soluble polyethylene oxides there may be used water-soluble copolymers of ethylene oxide and other alpha-oxides, advantageously propylene oxide, or the derivatives thereof whose chains have been extended or branched by reaction with bivalent or polyvalent acylating agents such as di- or polyisocyanates or di- or polycarboxylic acid halides. Finally, water-soluble polyethers containing lateral hydroxyl groups, for example polyglycide, may be used instead of simple polyglycol ethers. It is surprising that polyglycide which is so rich in hydroxyl, even in an addition of 20% calculated on the acrolein copolymer, allows shaped structures obtained from a copolymer of 60% of acrylonitrile, to be stretched by more than 100%, for example 200%, at a temperature of 140° C., if the preceding drying has been carried out either at a moderate temperature, for example room temperature, or for a short time at an elevated temperature, for example 80 to 120° C.

Instead of the aforesaid polyglycide, other polyhydroxylated polyethers may be used, for example linear polymers of hydroxymethyl-hydroxyacylobutanes which preferably contain only one hydroxymethyl group per basic unit. Alternatively, there may be used alcohols of polymeric structure whose hydroxyl groups are separated from one another by at least four carbon atoms as is the case with polyallyl alcohol. Polyalcohols with less than four carbon atoms between the hydroxyl groups may also be used; in this case, the amount to be added is kept relatively low and should not exceed 5% calculated on the copolymer. It is assumed that in this case a limit is given by the possibility of the formation of rather stable cyclic acetal groups.

Finally, there may be used polyglycol compounds of higher monohydric alcohols such as dodecanol or oleyl alcohol, higher oxalkylated carboxylic acid amides such as lauric acid amide or oleic acid amide or higher oxalkylated amines, for example dodecylamine reacted with 24 mols of ethylene oxide. The shaped structures obtained by the process of the invention, especially those made from copolymers of acrolein with acrylonitrile as predominant component, no longer become brittle on storing and can therefore advantageously be used for many practical applications. Films from copolymers of acrolein with acrylic acid methyl ester or acrylonitrile may be used, for example, as protective films. Small ribbons may be used in the textile industry as effect threads, whereby they have the great advantage that they can be easily dyed with dyestuffs containing basic groups, especially in fiber mixtures.

Fibers and filaments from copolymers of acrolein and acrylonitrile, for example in a ratio of 30:70, may be generally used in the textile industry. They are distinguished over the known commercial fibers of polyacrylonitrile by their improved absorbing power for dyes.

The process of the invention permits the production of fibers of polyacrylonitrile having a relatively low content of acrylonitrile, which fibers are suitable for use in the textile industry. Up to now, fibers have been made substantially from copolymers containing at least 80%, preferably more than 85% of acrylonitrile.

The shaped structures made by the process of the invention which contain 0.7 to 3.5% of free sulfo groups can be very well dyed with basic dyestuffs and dispersion dyestuffs. The rather high relative moisture absorption of the shaped structures is noteworthy. In the case of filaments it may amount to up to 5% at 20° C. and a relative atmospheric moisture of 65%. The filaments are distinguished by a good crease recovery; they possess a very good loop tenacity and have a relative knot tenacity of 90%.

The following examples serve to illustrate the invention but they are not intended to limit it thereto, the parts being by weight.

Example 1

Sulfur dioxide was introduced, while stirring, into a suspension of 10 parts of a copolymer of acrolein and acrylonitrile in 90 parts of water until the suspension was saturated. When the polymer was completely dissolved, which took about 3 days at room temperature, the solution was filtered and the sulfur dioxide in excess was removed by evacuation at 25° C. The solution was then poured on to glass plates and allowed to dry for 12 hours at room temperature. The resulting film had a tensile strength of 817 kg./cm.$^2$ at an elongation at break of 11%.

The film was stretched by 500% of its initial length by drawing it over a heated stretching drum. The clear and flexible stretched film was resistant to boiling water and the usual organic solvents such as alcohols, ketones, esters, halogenated hydrocarbons and dimethyl formamide.

At a relative atmospheric moisture of 65%, the film contained 7.8% of water. The sulfur content amounted to 1.8%. Since the oriented film still contained sulfo groups, it could be dyed dark tints which were fast to water with basic dyestuffs. After the heat-stretching the film was no longer soluble in aqueous sulfurous acid, not even at elevated temperatures.

The copolymer of acrolein and acrylonitrile used in the above example had been prepared as follows:

In a flask provided with a stirrer, reflux condenser, thermometer and inlet pipe for nitrogen, 1.9 parts of sodium persulfate were dissolved in a mixture of 215 parts of 1,2-propylene glycol and 40 parts of water, while nitrogen was passed through. The solution was then admixed at room temperature, while stirring, with 34 parts of acrolein and 64 parts of acrylonitrile and then with a solution of 1.52 parts of sodium metabisulfite in 45 parts of water. The batch was kept at 40° C. for 14 hours, while stirring and introducing nitrogen. Then 500 parts of water were added, the fine-grained precipitate was suction-filtered and washed with 15,000 parts of water. After drying in vacuo at room temperature, a yield of 91 parts=84% of the theoretical was obtained. The product was colorless and well soluble in aqueous sodium bisulfite or sulfur dioxide solution. Relative viscosity 1.60; nitrogen content 16.5% (determined according to Kjeldahl).

*Example 2*

A film obtained according to Example 1 by drying at room temperature was stretched by 200% at 80° C. By the stretching operation, the tensile strength of the film was increased from an initial 820 kg./cm.$^2$ to 1835 kg./cm.$^2$ at an elongation at break of 9%. The stretched film was resistant to boiling water.

*Example 3*

A solution obtained as described in Example 1 was cast into a film which was dried on the plate at 120° C. for 35 minutes. After the drying at elevated temperature, the tensile strength before stretching was superior to that obtained in Example 1 and amounted to 1050 kg./cm.$^2$, the elongation at break was 6%. The film could be stretched by 180% of its initial length by drawing it over a surface heated to 150° C., whereby the tensile strength was simultaneously improved considerably.

When the film was dried on the plate for 50 minutes at 80° C., the tensile strength was 940 kg./cm.$^2$, the elongation at break amounting to 6% and the density to 1.25 g./cm$^2$. The film could be stretched at 150° C. by 290% of its initial length.

*Example 4*

A copolymer of acrolein and acrylonitrile which had been made as described in Example 1 and had a nitrogen content of 13.7% and a relative viscosity of 2.07 was dissolved in aqueous sulfurous acid to obtain a 10% solution (viscosity 635 centipoises determined at 25° C. in a Höppler viscometer). The film cast from the solution was dried for 12 hours at room temperature and stretched by 450% of its initial length by drawing it over a surface heated to 120° C. The film had a considerably improved tensile strength.

*Example 5*

0.5 part of polyethylene oxide of an average molecular weight of 20,000 was dissolved at room temperature in 100 parts of the polymer solution of Example 1. A film cast from that solution was dried on the plate for 12 hours at room temperature. It had a tensile strength of 700 kg./cm.$^2$ and an elongation at break of 11%. The film was then stretched at 120° C. by 300% of its initial length. After stretching, the film which had initially been amorphous as could be detected by X-rays exhibited two distinct Debye rings. The stretched film was resistant to boiling water and had an improved tensile strength. It could be very well dyed with basic dyestuffs such as Auramin O (cf. Schultz, Farbstofftabellen, 7th edition, No. 752).

*Example 6*

2 parts of high molecular weight polyglycide obtained according to German Patent 575,750 were dissolved in 100 parts of the polymer solution of Example 1. The solution was cast into a film and the latter was dried on the plate for 35 minutes at 120° C. the film was then stretched at 150° C. by 70% of its initial length.

*Example 7*

0.5 part of polyethylene oxide of particularly high molecular weight (viscosity 2000 centipoises determined at 25° C. in an aqueous 5% solution) was dissolved in 4 parts of water and the batch was admixed with 100 parts of the polymer solution of Example 1. After casting, the films were dried on the plate for 25 minutes at 80° C. The film was then stretched at 150° C. by 300% of its initial length.

*Example 8*

1 part of the polyethylene oxide of Example 7 was dissolved in 4 parts of water, the batch was mixed with 100 parts of the polymer solution of Example 1 and the resulting solution was cast in to a film which had a tensile of 1042 kg./cm.$^2$ after drying for 75 minutes at 80° C. The film was further strengthened by stretching it at 150° C. by 280% of its initial length.

*Example 9*

A 15% solution of the copolymer of Example 1 (nitrogen content 16.5%) in a saturated aqueous sulfur dioxide solution, which was kept at room temperature was freed from all but 7%, calculated on the solution, of the excess amount of sulfur dioxide, extruded through a glass nozzle 0.2 mm. in diameter and drawn upwards at a rate of 20 m./min. through a cylindrical drying shaft 1.2 m. long which was electrically heated to 200° C. (temperature of the drying air) and the filament so obtained was wound on to a bobbin. The dry filament was then after-stretched at 50° C. by 300% of its initial length. The oriented filament shrinked by 15% in boiling water but was then resistant to boiling water and could be very well dyed with basic dyestuffs such as malachite shade. The tensile strength amounted to 2.9 g./den. at an elongation at break of about 30%. The filament had a circular cross-section.

The subsequent stretchability depended on the temperature of drying. When the temperature in the drying shaft was increased to 250° C., while otherwise applying the same conditions, the stretchability decreased from 300% to about 250%.

*Example 10*

A copolymer of acrolein and acrylonitrile obtained as described in Example 1 and which had a nitrogen content of 11.2% and a relative viscosity of 1.50 was dissolved in aqueous sulfurous acid to obtain a 20% solution which was cast into a film. After drying for 70 minutes at 80° C., the unstretched film had a tensile strength of 680 kg./cm.$^2$ and an elongation at break of 6%. The film could be stretched by 100% by drawing it over a cylinder heated to 150° C., whereby the tensile strength was considerably improved.

*Example 11*

A copolymer of acrolein and acrylonitrile obtained as described in Example 1 and which had a nitrogen content of 14.95% and a relative viscosity of 1.63 was dissolved in aqueous sulfurous acid to obtain a 20% solution which was cast into a film. After drying for 70 minutes at 80° C., the unstretched film had a tensile strength of 770 kg./cm.$^2$ and an elongation at break of 7%. The film could be stretched by 200% of its initial length by drawing it over a heating surface of 150° C.

The clear and flexible stretched film was resistant to boiling water and showed no signs of embrittlement on storing.

*Example 12*

A 10% solution of a copolymer of acrolein and acylic acid methyl ester of a relative viscosity of 1.52 was cast into a film. After drying at room temperature, the film had a tensile strength of 580 kg./cm.$^2$ at an elongation of 12%. It could be stretched by 200% by drawing it over a heating surface of 90° C., whereby the tensile strength was considerably increased. The oriented film was much more flexible than the films obtained from the copolymers made with the use of acrylonitrile.

The copolymer had been prepared as follows:

Under a nitrogen atmosphere, 28 parts of acrolein and 43 parts of acrylic acid methyl ester were added, while stirring, to a solution of 5 parts of polyethylene oxide of a molecular weight of 20,000 and 0.592 part of sodium persulfate in 75 parts of water. The emulsion was then admixed at 20° C. with 5 parts of an 0.1 N solution of silver nitrate and after 1 hour with a solution of 0.479 part of sodium metabisulfite in 25 parts of water. After polymerizing for 20 hours at 20° C., the product was worked up as described above.

Yield: 68.3 parts=96% of the theoretical; η rel.: 1.52; content of methoxyl groups: 21.1%.

*Example 13*

A 15% solution of the copolymer of acrolein and acrylonitrile described in Example 1 (nitrogen content 16.5% determined according to Kjeldahl, relative viscosity 1.60) in aqueous sulfurous acid, which solution had a temperature of 20° C., was extruded from above under a pressure of 3 atmospheres through a one-hole extrusion die of glass 0.3 mm. in diameter into a vertical shaft which was 5 m. long and 150 mm. in diameter and was electrically heated. The spinning solution had a viscosity of 9950 centipoises and a content of free SO$_2$ of 5.3%. The temperature of the air near the nozzle was 25° C. After 2 m. the temperature in the shaft gradually reached 140° C. At the lower end of the shaft, the filament was drawn off: at a rate of 350 m./min. and wound up. It had a titer of 0.6, a tensile strength of 4.1 g./den. and an elongation at break of 163%. The filament so obtained was then stretched by 300 to 400% by drawing it over a metal surface 40 mm. long which was heated to 140° C. The stretched filament had the following properties:

| | |
|---|---|
| Tensile strength | 5.8 g./den. |
| Elongation at break | 15%. |
| Density | 1.223 g./cm.$^3$. |
| Relative moisture absorption | 4 to 5% (at an atmospheric moisture of 65% and 20° C.). |
| Double refraction | 4.5.10$^{-3}$. |
| X-ray diagram | Amorphous. |

The colourless and shining stretched filament could be well dyed with basic dyestuffs and dispersion dyestuffs and possessed a good crease recovery.

*Example 14*

A 20% solution of a copolymer of acrolein and acrylonitrile obtained as described in Example 1 (nitrogen content 14.1% determined according to Kjeldahl, relative viscosity 1.68) in aqueous sulfurous acid was spun through a one-hole extrusion die of glass 0.3 mm. in diameter into a drying shaft 5 meters long as described in Example 13. The spinning solution contained 7.6% of free SO$_2$ and had a viscosity of 3,600 centipoises. At the lower end of the shaft the filament was drawn off at a rate of 150 m./min. and wound up. It had a tensile strength of 3.9 g./den. and an elongation at break of 151%. The filament was stretched by drawing it over a 40 mm. long metal surface having a temperature of 160° C., whereby the tensile strength was increased to 4.6 g./den. at an elongation at break of 23%.

The relative viscosities indicated in the preceding examples were determined on 1% solutions of the copolymers in 10% aqueous sulfurous acid at a temperature of 20% in an Ostwald viscometer.

The viscosities which are indicated in centipoises were measured on concentrated solutions in a Höppler viscometer.

We claim:

1. A process for the manufacture of shaped structures from copolymers of acrolein, which comprises shaping an aqueous solution of an adduct consisting of sulfur dioxide additively combined with a copolymer of acrolein and at least 30% by weight of a derivative of acrylic acid selected from the group consisting of acrylonitrile, alkyl esters of acrylic acid, and alkyl amides of acrylic acid, and stretching the shaped structures so obtained at a temperature within the range of 50 to 200° C. after the water has been removed by evaporation.

2. The process of claim 1, wherein the water is removed at a temperature below 200° C. from the shaped structures to be stretched.

3. A process for the manufacture of shaped structures from copolymers of acrolein, which comprises shaping an aqueous solution of an adduct consisting of sulfur dioxide additively combined with a copolymer of acrolein and at least 50% by weight of acrylonitrile and stretching the shaped structures so obtained at a temperature within the range of 50 to 200° C. after the water has been removed by evaporation.

4. The process of claim 1, wherein the shaped structures are filaments.

5. The process of claim 1, wherein the shaped structures are films.

6. The process of claim 3, wherein the shaped structures are stretched by 200 to 600% of their initial length.

7. The process of claim 1, wherein the solutions to be shaped contain 3 to 8% by weight of free sulfur dioxide not bound to aldehyde.

8. The process of claim 1, wherein the solutions to be shaped contain up to 20% by weight of a water-soluble polyglycol ether.

9. The process of claim 1, wherein the solutions to be shaped contain up to 10% by weight of water-soluble polyhydroxyl compounds of high molecular weight, in which the hydroxyl groups are separated from one another by more than 3 carbon atoms.

10. The process of claim 1 wherein said copolymer is a copolymer obtained by dissolving acrolein and acrylonitrile in a mixture of water, 1,2-propylene glycol, and a persulfate, adding an aqueous solution of sodium metabisulfite thereto, then heating the whole, and precipitating the resulting copolymer by addition of water.

References Cited in the file of this patent

UNITED STATES PATENTS

| | | |
|---|---|---|
| 2,071,419 | Moss | Feb. 23, 1937 |
| 2,114,292 | Frey et al. | Apr. 19, 1938 |
| 2,265,722 | De Nie | Dec. 9, 1941 |
| 2,416,536 | Neher et al. | Feb. 25, 1947 |
| 2,996,481 | Eifert et al. | Aug. 15, 1961 |